United States Patent [19]

Rosset

[11] Patent Number: 5,076,047
[45] Date of Patent: Dec. 31, 1991

[54] FRUIT HARVESTER

[75] Inventor: Rene R. Rosset, Winnipeg, Canada

[73] Assignee: Reno Manufacturing Ltd., Winnipeg, Canada

[21] Appl. No.: 585,183

[22] Filed: Sep. 20, 1990

[51] Int. Cl.[5] .............................................. A01D 46/26
[52] U.S. Cl. ...................................... 56/330; 56/340.1
[58] Field of Search ...................... 56/330, 328.1, 329, 56/340.1

[56] References Cited

U.S. PATENT DOCUMENTS

| 924,552 | 6/1909 | Holmes . | |
|---|---|---|---|
| 2,459,471 | 1/1949 | Tebbetts . | |
| 2,544,443 | 3/1951 | Brateng . | |
| 2,607,180 | 8/1952 | Stankavich et al. . | |
| 2,696,706 | 12/1954 | Getsinger . | |
| 2,732,677 | 1/1956 | Nielson | 56/330 |
| 2,915,871 | 12/1959 | Furford . | |
| 3,623,309 | 11/1971 | Stang et al. | 56/330 |

OTHER PUBLICATIONS

J. S. Shoemaker, Small Fruit Culture, 5th Edition, AVI Publishing, Westport, Connecticut, 1978, pp. 316 to 351.
H. Willett & Associates, Fresh Fruit Harvesting & Handling Project, Jeanerette, LA, 1989, pp. 1 to 28 (All).

Primary Examiner—Terry L. Melius
Attorney, Agent, or Firm—Robert W. B. Bailey

[57] ABSTRACT

A cranberry harvester has a array of vertically oscillatable tines extending forward and over a ground roller. The roller pulls the vines through the tine array, stripping the berries, without damaging the vines or jamming the tines. Round upwardly curved tapered tines pivoted on a transverse bar are independently oscillated by a transverse camshaft to disentangle the vines effectively. Fruit is removed through a suction duct to a storage bin. The cranberry harvester is conveniently mounted on either a center articulated self propelled chassis, or a unitary self propelled chassis.

20 Claims, 5 Drawing Sheets

FRUIT HARVESTER

This invention relates to a fruit or berry harvester having a horizontal array of vertically oscillating tines. This fruit harvester is particularly suitable to pick berries which grow on a vine, such as cranberries. The oscillating tines pass through the vine growth below the fruit. The vines are pulled down through the tines by a roller just below the tines. As they pass down through the tines, the vines are stripped of fruit.

PRIOR ART AND BACKGROUND OF INVENTION

Cranberry scoops or shovels are known, and are now obsolete. These are essentially a shovel with an array of teeth or spikes at the outer end. The scoop is thrust into the vines below the fruit and agitated, by twisting, pushing in and out, and shaking from side to side, etc. The fruit falls into the scoop.

A number of experimental mechanized cranberry pickers are discussed in a publication entitled "Fresh Fruit Harvesting and Handling Project, Ocean Spray Cranberries, Inc." by H. Willett & Associates, of Jeanerette, La., Sept. 1989. These pickers had a fruit picking head, conveyor(s), and a storage hopper or bin on the machine.

One picker [aluminum head 1987] has a horizontal array of fixed round ½ inch tines, brushes mounted above the tines on an conveyor push the vines down onto the tines, which comb off the fruit. The brushes then carried the fruit up the tines to the back of the head, where apparently a first cross conveyor carried the fruit to a second upward conveyor dropping the fruit into a hopper. The machine had a rigid chassis. The round tines did not damage the small amount of fruit picked. The brush arrangement was found to be too heavy, while the brushes tended to push down the vines ahead of the tines. The head was difficult to raise and lower and the machine was difficult to maneuver.

A second head for the same machine of pvc plastic [2nd head 1987], had the brush conveyor extending forward and above the tines, to first raise the vines to get the fruit above the tines. This was better at fruit pick up, but still hard to operate and control the head.

A tricycle picker (1987) was tried with a third head with round tines and a reel type vine lifter and a central conveyor to the storage hopper. It did not work too well, but did not damage the fruit picked. The unit was hard to control. The chassis was modified to four wheels, the head was modified slightly (1987). Picking did not improve but handling did.

A modified picker head [May 1988 dry run test] had round tines and a forward brush arrangement, which lifted the vines ahead of the tines and carried the fruit up the tines. A single central conveyor fed the hopper. A spring test picked up berries on the ground and stones. A vacuum or suction fan device was used to remove trimming and leaves from the conveyor discharge.

All the preceding heads incorporated large circular saw blades to prune the vines, above the tines.

Another picking head [1988 combine] was designed with flat tines, brush conveyor forward of the tines and sickle bar pruners behind the tines. The brushes lifted the vines but pruned vines tended to jam in the tines. Fruit pick up was better, but still left too much fruit. The pruners did not work as well as hoped.

A modified version [modified #1 combine 1988] with flat tines, pick up reel forward and above the tines to lift the vines, circular saw blade pruners forward and above the tines, and brush conveyor.

This version was remodified [1989 combine] using round tines 3/8 inch, pick up reel, circular saw blade pruners and brush conveyor.

As may be seen several fruit pickers are known.

It is an object of the invention to provide an improved fruit picker. Other objects are hereinafter apparent from the description, claims, and drawings.

DESCRIPTION OF THE INVENTION

In a first broad aspect the invention is directed to an improved fruit harvester including a chassis having front and rear ends where the improvement comprises in combination transverse ground roller means mounted forward of the front end, and tine means immediately above the ground roller means arrayed transversely of the front end. This tine means is oscillatably mounted on the front end, extending longitudinally of the chassis and extending forward of the front end to form a forward end. This forward end of the tine means when in neutral position is level and slightly below the top of the roller means. The tine array is just above the roller as close as possible, without actual contact during oscillation. In practice this distance is preferably about 1/8 inch at the lowest point of the tines during oscillation. This results in the forward ends of the tines being slightly below the top of the roller means. Preferably the tine means comprises a plurality of tines, each tine having a front section, a rear section, and an intermediate section connecting the front section and the rear section. The intermediate and front sections together form a rounded tapered portion extending forward to a point, the front section being straight, and the intermediate section being curved upward. The rear sections of the tines are suitably of square section and abut against adjacent rear sections of tines. These rear sections of the tines are conveniently fixedly attached to transverse oscillatable plate means, which may be connected by springs to fixed plate means attached to the chassis, the fixed plate means mounting oscillating means, the oscillating means including motor means, shaft means driven by the motor means, and offset weight means mounted on the shaft means. Suction duct means may have intake means transverse of the front end above the tine means. The chassis is conveniently self propelled.

In another broad aspect the invention is directed to an improved fruit harvester including a chassis having front and rear ends, where the improvement comprises in combination transverse ground roller means mounted forward of the front end, and independently oscillatable tine means immediately above the ground roller means arrayed transversely of the front end, the tine means being mounted on the front end. The tine means extend longitudinally of the chassis and forward of the front end to form a forward end, the forward end of the tine means when in neutral position being level and slightly below the top of the roller means. Preferably the tine means comprises a plurality of tines, each the tine having a front section, a rear section, and an intermediate section connecting the front section and the rear section, the intermediate and front sections together forming a rounded tapered portion extending forward to a point, the front sections being straight, and the intermediate section being curved upward. These rear sections of the tines are typically of square section and abut against adjacent rear sections of tines. These rear sections of the tines are conveniently pivotally mounted on transverse bar means mounted on the chassis. Transverse camshaft means may contact the rear sections of the tines, the camshaft having alternately offset cams, contacting alternate rear sections of the tines. Suitably there are intake means for suction duct means transverse of the front end above the tine means. Conveniently the chassis is self propelled.

In a third broad aspect the invention is directed to an improved fruit harvester including a four wheeled self propelled chassis having front and rear ends the improvement comprising in combination transverse ground roller means mounted forward of the front end, and a plurality of independently oscillatable tines. Each tine has a front section, a rear section, and an intermediate section connecting the front section and the rear section, the intermediate and front sections together forming a rounded tapered portion extending forward to a point, the front sections being straight, and the intermediate section being curved upward, the tine means extending longitudinally of the chassis and extending forward of the front end, the forward end of the tine means when in neutral position being level and slightly below the top of the roller means, intake means for suction duct means transverse of the front end above the tine means, the suction duct extending rearward to pass over fruit storage means to suction generating means. The rear sections of the tines are typically of square section and abut against adjacent rear sections of tines. These rear sections of the tines are preferentially pivotally mounted about transverse bar means mounted on the chassis. Preferably transverse camshaft means contact the rear sections of the tines, the camshaft having alternately offset cams, contacting alternate rear sections of the tines. The chassis may include a first front section and a second rear section connected by center articulation, the rear section including the fruit storage means and the suction generating means. Conveniently the suction generating means is fan means.

In another broad aspect the invention is directed to an improved fruit harvester including a chassis having front and rear ends, and tine means arrayed transversely of the front end and mounted thereon, by providing suction duct means. This suction duct means has intake means transverse of the front end above the tines. The suction duct extends rearward to pass over fruit storage means to suction generating means. The suction duct means includes forward wall means spaced apart a substantially constant distance from rear wall means extending transverse of the tine means. Spaced apart side wall means connect the forward and rear wall means, extending upward from the intake means, to curve rearward. The rear wall means has a transverse rear end above the fruit storage means. The suction duct means preferably has substantially the same cross sectional area from the intake means to the rear end of the rear wall means. The intake means of the suction duct means may extend laterally outside the tine array. The suction duct means preferably extends substantially vertically upward from the intake means, to curve rearward.

Applicant has found that employing the ground roller to pull down the vines through independently oscillating rounded tapered tines is effective in harvesting the fruit, without damaging the fruit, or the vines, or jamming the tines with vines.

The taper and size of the tines can be varied, as would be understood by those skilled in the art, so as to strip berries of fruits of suitable size from vines. This fruit picker is particular suitable for stripping vines, where the vines are perennial, and the vines are not new growth each year. Although designed with cranberries in mind, it is not restricted thereto, and with dimensional changes can be utilized in harvesting other similar fruits.

BRIEF DESCRIPTION OF THE DRAWINGS

Preferred embodiments are indicated in the drawings where.

DESCRIPTION OF THE PREFERRED EMBODIMENTS

Figure 1:
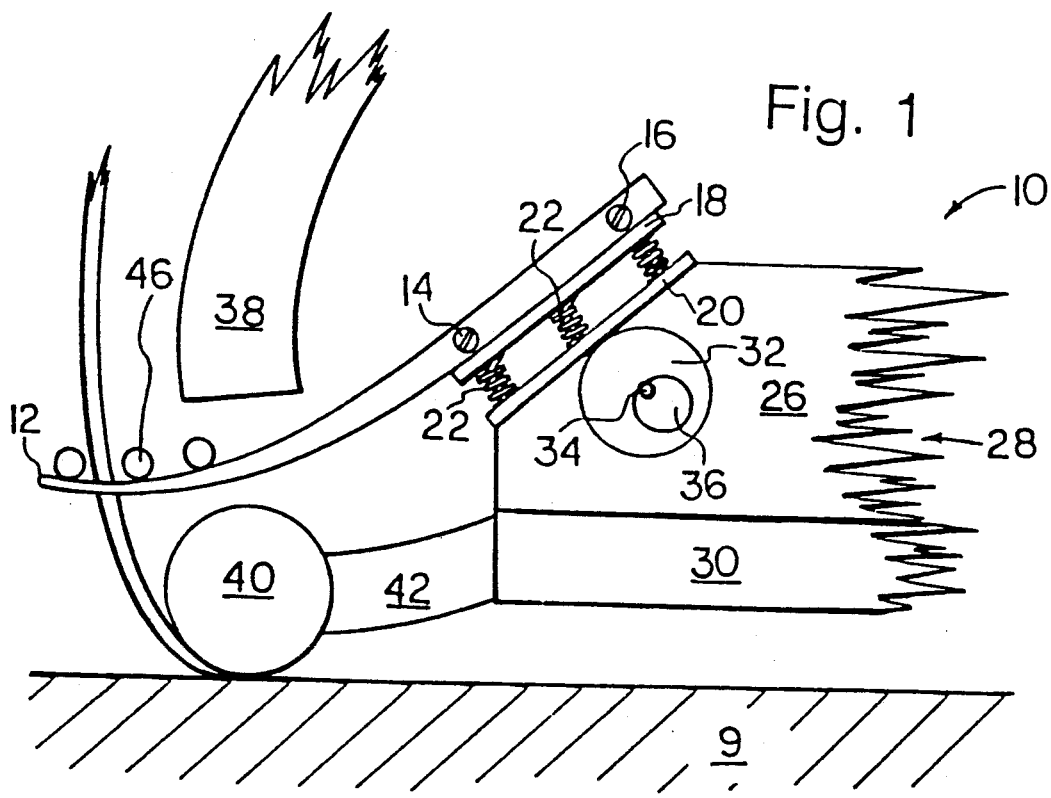
FIG. 1 shows a partly cutaway side view of a first preferred embodiment of the invention.
Figure 2:
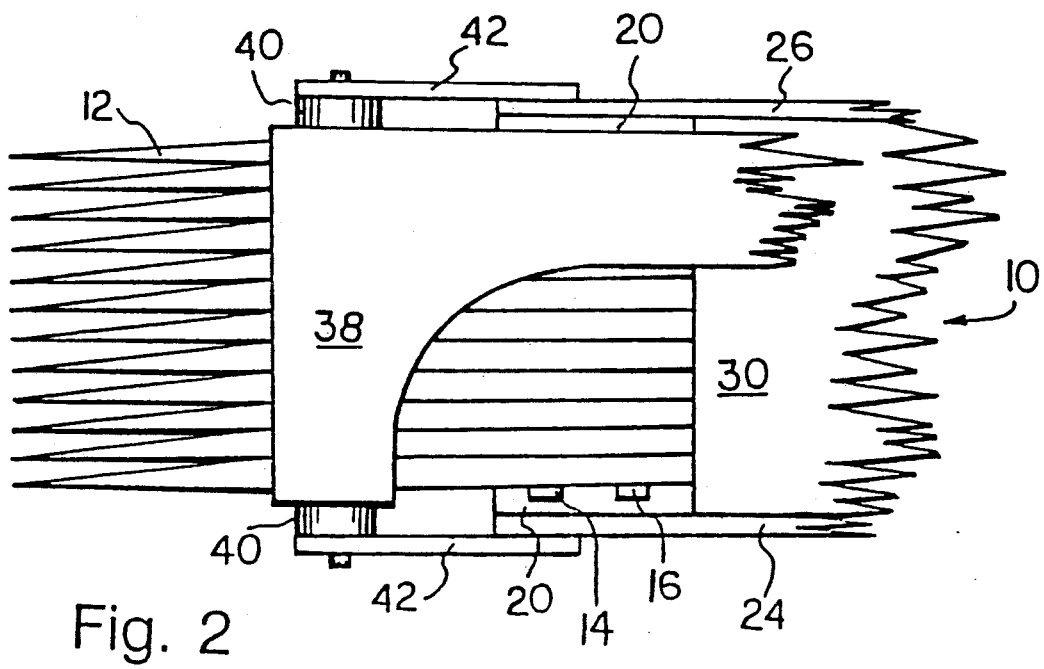
FIG. 2 shows a top view of the embodiment of FIG. 1.
Figure 3:
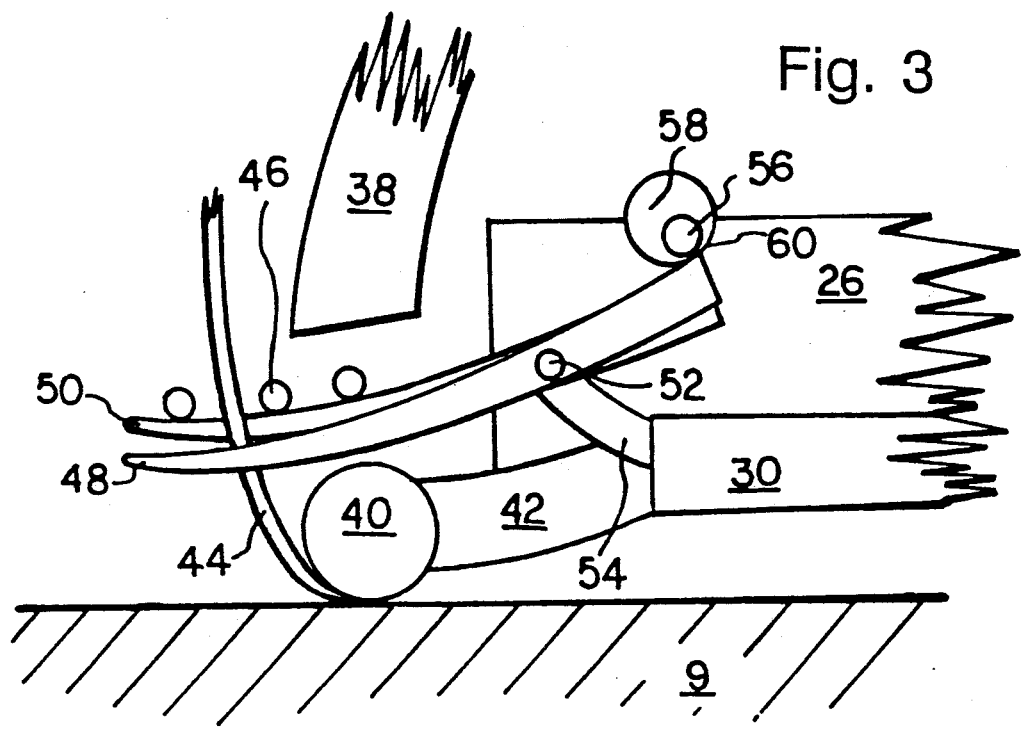
FIG. 3 shows a partly cutaway side view of a second preferred embodiment of the invention.
Figure 4:
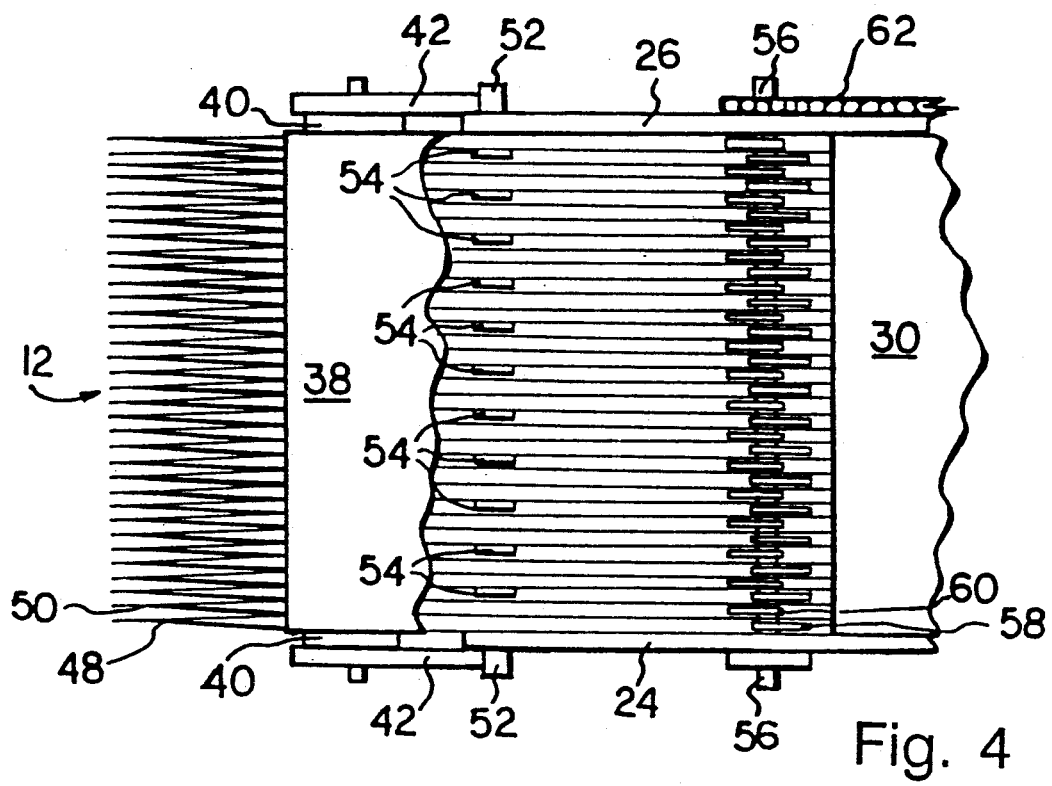
FIG. 4 shows a top view of the embodiment of FIG. 3.
Figure 5:
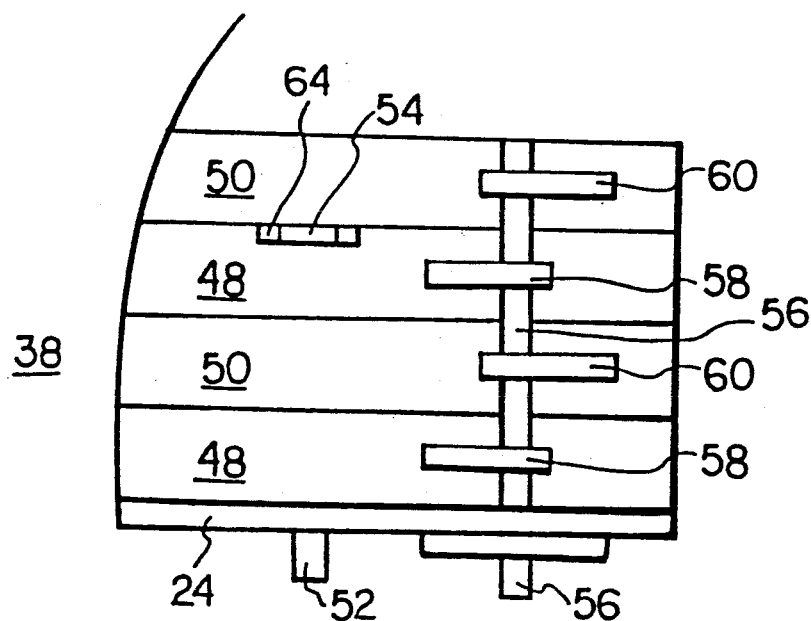
FIG. 5 shows a more detailed top view of a portion of the embodiment of FIG. 3.
Figure 6:
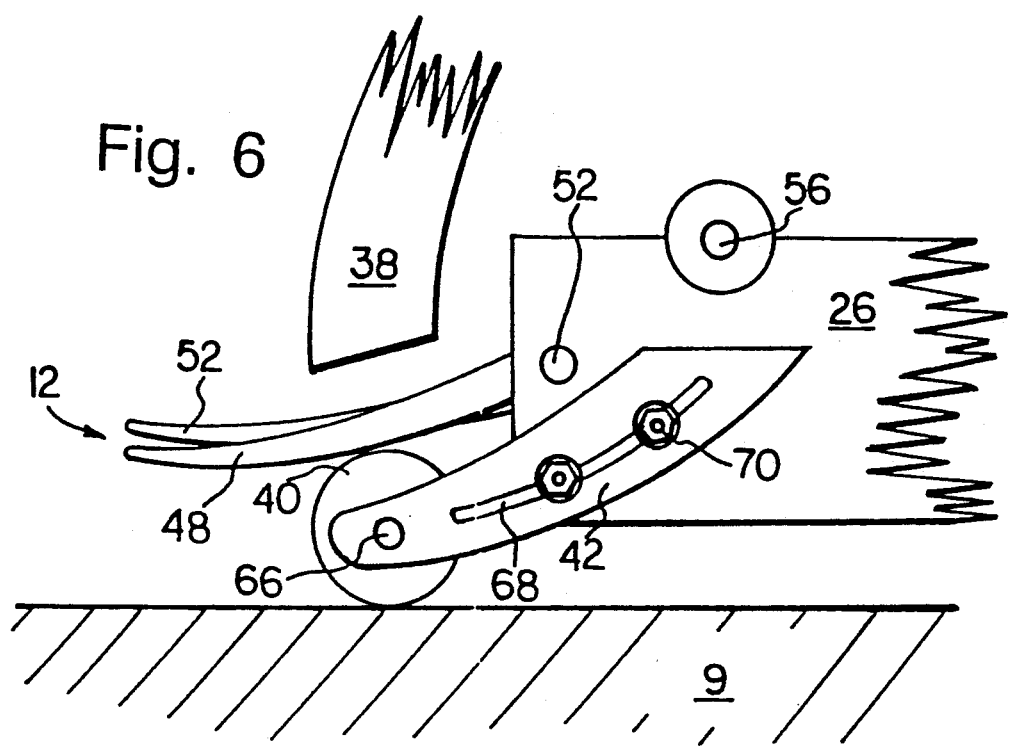
FIG. 6 shows a detailed side view of a portion of the embodiment of FIG. 3.

The general description of the invention is now expanded by reference to the drawings, which illustrate preferred embodiments of the invention.

Numeral 9 indicates the ground of the cranberry bog, picker 10 has tine array 12 of twelve 1 inch steel bars with rounded ends tapered to a point, held together by bolts 14 and 16 passing transversely through the bars. Array 12 is fixed by welding or otherwise to plate 18, which is connected to plate 20 by springs 22. Plate 20 is fixed to side plates 24 and 26 of chassis 28 of picker 10. Side plates 24 and 26 are attached to chassis base 30. Electric motor 32 is mounted beneath plate 22 and rotates shaft 34 on which is mounted off-center weight 36. Above tine array 12 is vacuum or suction duct 38, below tine array 12 is roller attached by support 42 to chassis base 30.

In use motor 32 is switched on vibrating plate 22. This vibration is passed through springs 22 to plate 18 and tine array 12, which then vibrates up and down, and side to side. The picker is then moved into the vines, as shown vine 44 is pulled down by roller 40, stripping berries 46, which are sucked into duct 38, and thence to a hopper for storage. This device was tested on an untrained vine bed in cranberry field or bog, and harvested the berries fairly satisfactorily, but did not push through the vine tangle as well as would be required in practice.

The embodiment of FIGS. 3 to 6, has a tine array 12 of thirty six independently oscillatable tines 48 and 50, which are pivotally mounted on transverse bar 52. Transverse camshaft 56 has offset cams 58 and 60 which on rotation of the camshaft by conventional drive chain 62, move the tines 48 and 50 about bar 52. Bar 52 is supported by supports 54 welded to chassis base 30.

Every third tine has recess 64 to accommodate support 54.

In use tines 48 and 50 are approximately horizontal approximately at the same height as the top of roller 40, as picker 10 advances they oscillate up and down sliding into the vine bed. Vine 44 is pulled down between the tines by roller 40, stripping off fruit 46, which is then sucked up by vacuum or suction duct 38. The separate oscillation of each tine was found to untangle the vines better. The vacuum duct sucks stripped fruit from the tines or spikes into the container. Suction is preferred to a brush conveyor, because it causes less damage to the picked fruit.

Roller 40 is adjustably supported by support 42, which is journalled to receive roller axle 66. Support 42 has curved slot 68 to allow relative movement of support 42, and side plate 26, to which it is attached by nut, threaded rod and washer assemblies 70 and 72. This allows reasonable adjustment of the height of tine array 12 to suit particular circumstances. Greater adjustment would require changing the roller for one of different diameter.

Figure 7:
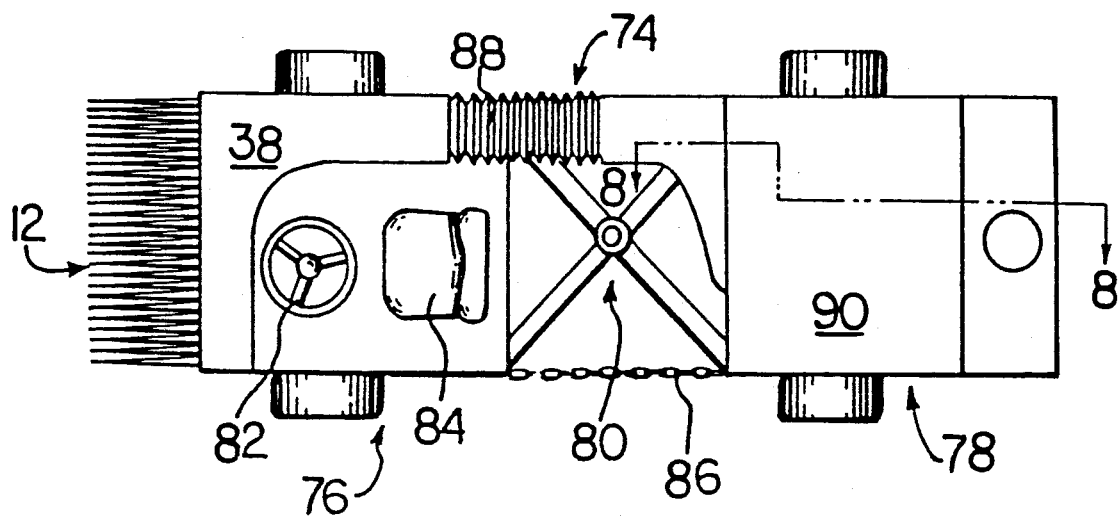
FIG. 7 shows a top view of a preferred vehicle including the embodiment of FIG. 3.
Figure 8:
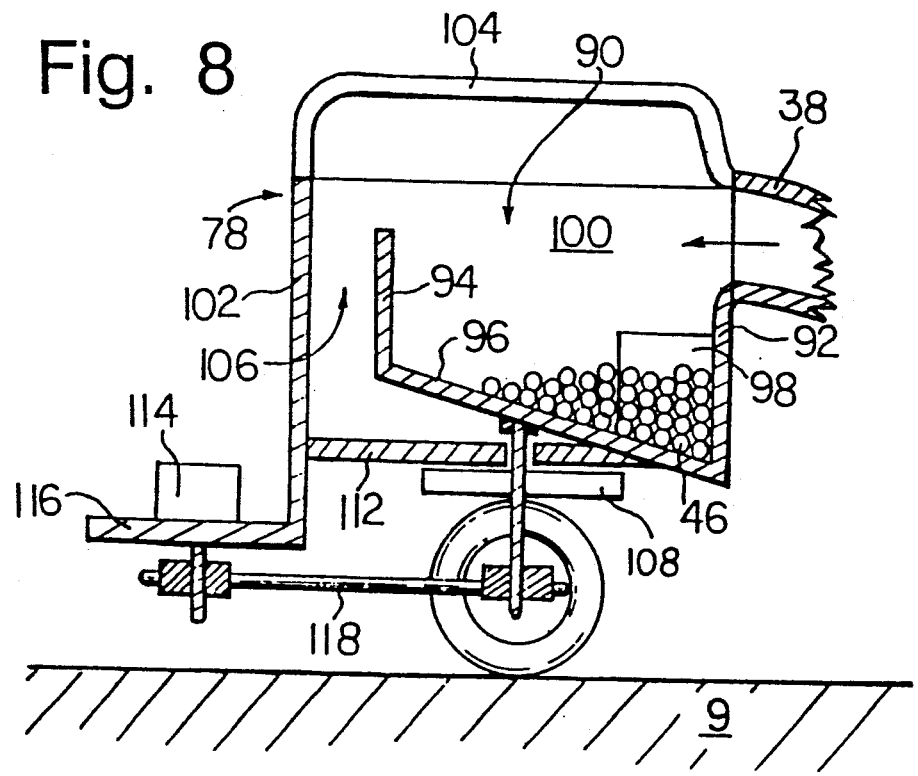
FIG. 8 shows a sectional view of the embodiment of FIG. 7.

One preferred vehicle 74 is shown in FIG. 7, with front section 76 and rear section 78 joined by center articulation 80. Front section 76 includes besides tine array 12 and vacuum or suction duct 38, steering wheel 82, and operator seat 84, steering control is through chains 86 (only left shown). Concertina portion 88 of duct 38 leads to hopper 90. Hopper 90 has front wall 92, rear wall 94 and angled floor 96, fruit 46 sucked along duct 38 falls down into the hopper, whence it can be removed through gate 98 in side wall 100. Rear section 78 has rear wall 102 and removable transparent roof 104 to allow inspection of and access to the interior of rear section 78 and hopper 90. Suction duct continuation 106 passes down behind hopper 90, between walls 94 and 102. Suction is provided by radial fan 108, which sucks air through hole 110 in floor 112. Fan 108 is driven by motor 114 mounted on flange 116, through belt drive 118.

In operation fruit 46 is sucked up duct 38, falling into hopper 90, the air and some loose leaves are sucked down duct continuation 106 through fan 108. The center articulated steering control is found convenient, because the rear wheels follow in the track of the front wheels, which reduces crushing of the vines into the ground by the wheels.

Figure 9:
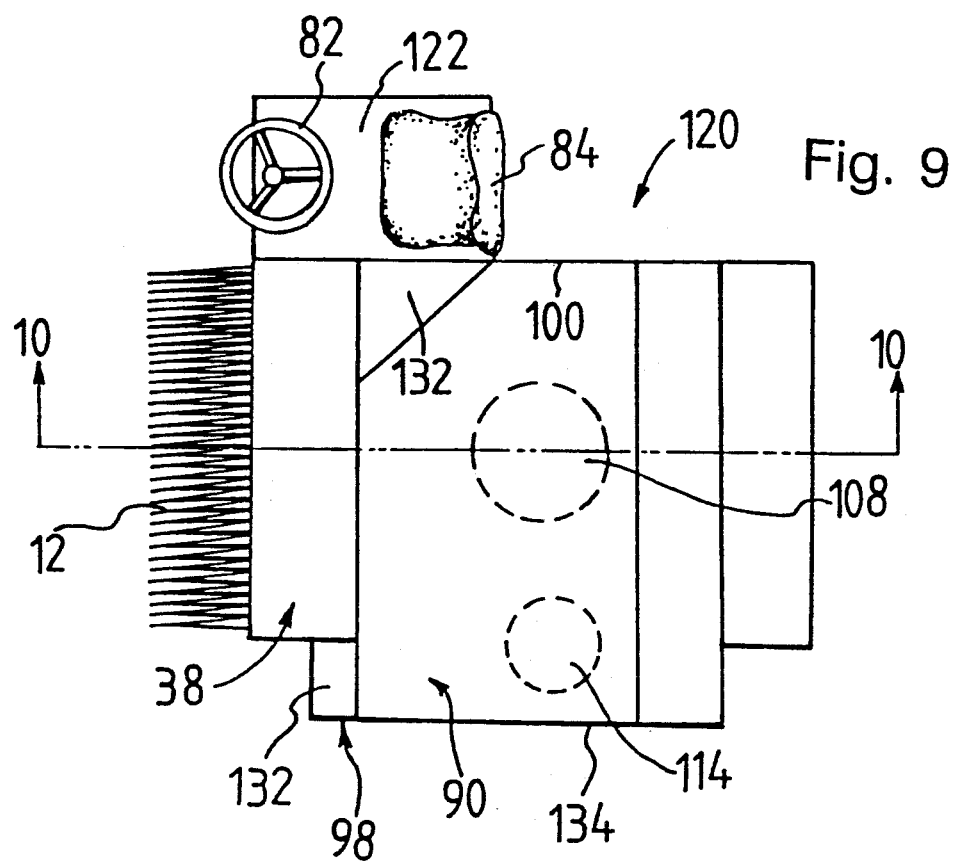
FIG. 9 shows a top view of another vehicle including the embodiment of FIGS. 3 to 6.
Figure 10:
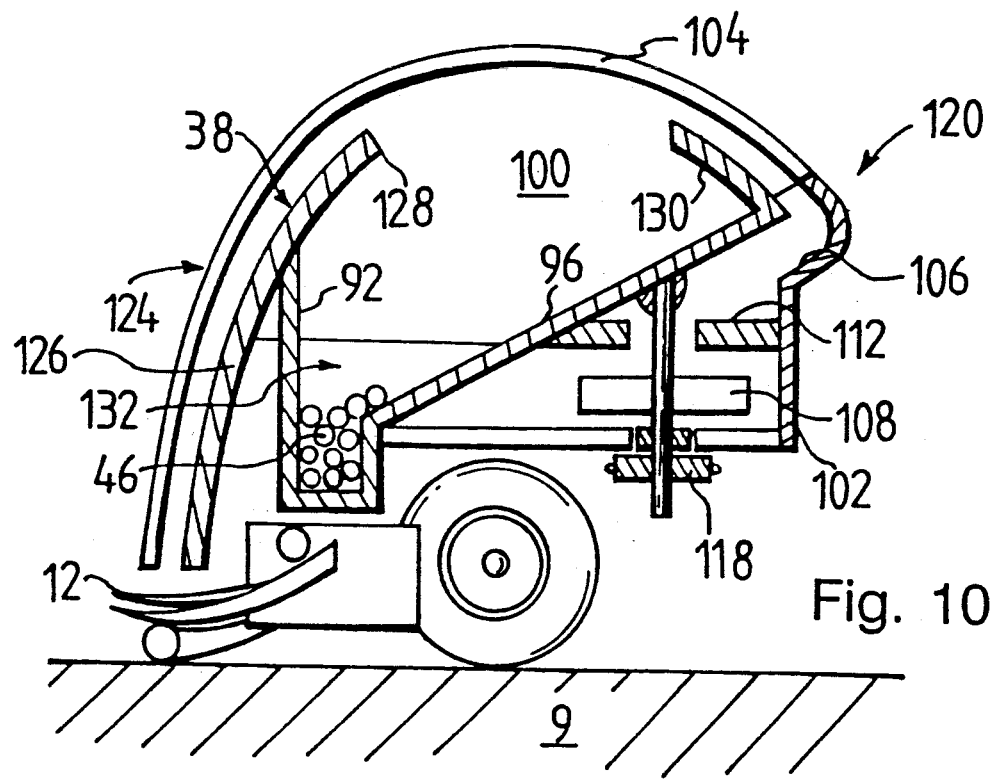
FIG. 10 shows a sectional view of the suction duct-hopper arrangement of FIG. 9.

FIG. 9 shows another preferred vehicle incorporating the embodiment of FIGS. 3 to 6, FIG. 10 illustrates the suction duct-hopper arrangement. Unitary chassis vehicle 120, has side platform 122 mounting steering wheel 82 and operator seat 84, suction duct 38 has transparent upper wall 124 merging with removable transparent roof 104 of hopper 90. Lower wall 126 of duct 38 extends upward over hopper 90, forming upward and inwardly curved duct wall 128, above front hopper wall 92. Bottom wall 96 extends upward over hopper 90, forming upward and inwardly curved duct continuation wall 130. Bottom wall 96 has forward channel 132, which slopes downward from side wall 100 to side wall 134 to door 98, allowing removal of harvested fruit. The overlap of duct 38 beyond tine array 12 was found to improve fruit collection, while the shorter duct reduces fruit damage. The angled channel also makes fruit recovery from the hopper easier. The extended duct front wall 128 makes fruit delivery to hopper 90 easier, while the extended duct continuation rear wall 130 reduces the amount of fruit passing down duct continuation 106. The relative positions of fan 108 and motor 114 are indicated in ghost in FIG. 9.

Preferred dimensions and details are as follows. Camshaft 56 has circular cams 58 and 60 about ¼ inch offset from the camshaft and thus about ½ inch offset from each other. The tines are 1 inch square bars and about 15 inches long, the square rear portion of the tines are about 5.5 inches long and have a circular hole about 5 inches from the rear end to accommodate support bar 52. About 5.5 inches from the rear end, and about ¼ inch from the centre of the circular hole, the tines are rounded and taper inward at approximately 3 degrees and continue to do so until the tip which is about 1/8 inch in diameter, and about 9.5 inches from the beginning of taper. The tapered portion of the tine is curved in a radius of curvature of about 11 inches, except for the last 2 inches or so which are flat. When in neutral position these last 2 inches of the tines in the picker are horizontal. Camshaft rotation moves the tips up and down about ½ inch from this neutral position, giving a total displacement of 1 inch or so from high to low position. The tines at low position are preferably about 1/8 inch above the top of roller 40. The tips of the tines in neutral position are approximately ¼ to 1 inch below the top of the roller 40. Roller 40 can have any suitable dimension. Depending on fruit height the roller can be 3 inches or more, 2 inches, 1.5 inches in diameter and any diameter can be used as long as the front of the tines are immediately below the fruit to be harvested, for one particular cranberry bog 3 inches was found satisfactory. The cranberries are roughly spherical and about ½ inch in diameter, they are thus stripped from the vines by the tines approximately 4 to 5 inches from the pointed ends. The roller and the vacuum or suction duct are set just behind this point, the roller to pull down the vine, and the vacuum or suction duct to remove the stripped fruit. The suction duct preferably extends fully across the tine array, even so some fruit falls off the tines rather than entering the duct. More preferably the duct is slightly wider than the tine array on either side, 1 inch wider on either side is found more effective in picking up fruit. The duct itself is preferably about 2 inches deep.

The independently oscillating tine picker was considered to meet two basic commercial criteria for a cranberry or similar fruit harvester. The damage to the vines was minimized by the oscillating tines which untangled the vines, as the stripping roller prevented the vines jamming in the tapered intertine gaps. The berry harvest was maximized, as much as 95% being picked on some passes.

As those skilled in the art would realize these preferred illustrated dimensions, details and components can be subjected to substantial variation, modification, change, alteration, and substitution without affecting or modifying the function of the illustrated embodiments.

Although embodiments of the invention have been described above, it is not limited thereto, and it will be apparent to persons skilled in the art that numerous modifications and variations form part of the present invention insofar as they do not depart from the spirit, nature and scope of the claimed and described invention.

I claim:

1. In a fruit harvester including a chassis having front and rear ends the improvement comprising in combination transverse ground roller means mounted forward of said front end, and tine means immediately above said ground roller means arrayed transversely of said front end, said tine means being oscillatably mounted on said front end, said tine means including a plurality of tines, each said tine having a front section, a rear section, and an intermediate section connecting said front section and said rear section, said intermediate and front sections together forming a rounded tapered portion extending forward to a point, said front section being straight, and said intermediate section being curved upward, each said tine extending longitudinally of said chassis, said front section of each said tine extending forward of said front end of said chassis to said point, said front sections of said tines when in neutral position being level and slightly below the top of said roller means, said rear sections of said tines abutting against adjacent rear sections of tines, said rear sections of said tines being fixedly attached to transverse oscillatable plate means.

2. The harvester of claim 1, wherein said transverse oscillatable plate means is connected by springs to fixed plate means attached to said chassis, said fixed plate means mounting oscillating means, said oscillating means including motor means, shaft means driven by said motor means, and offset weight means mounted on said shaft means.

3. The fruit harvester of claim 1, additionally including suction duct means having intake means transverse of said front end above said tines, said suction duct extending rearward to pass over fruit storage means to suction generating means.

4. The fruit harvester of claim 3, wherein said suction duct means comprises forward wall means spaced apart a substantially constant distance from rear wall means extending transverse of said tine means, and spaced apart side wall means connecting said forward and rear wall means, extending upward from said intake means, and curving rearward, said rear wall means having a transverse rear end above said fruit storage means.

5. The fruit harvester of claim 4, wherein said suction duct means has substantially the same cross sectional area from said intake means to said rear end of said rear wall means.

6. The fruit harvester of claim 5, wherein said intake means of said suction duct means extends laterally outside said tine array.

7. The fruit harvester of claim 4, wherein said chassis is selfpropelled.

8. In a fruit harvester including a chassis having front and rear ends the improvement comprising in combination transverse ground roller means mounted forward of said front end, and tine means immediately above said ground roller means arrayed transversely of said front end, said tine means being independently oscillatably mounted on said front end, said tine means including a plurality of tines, each said tine having a front section, a rear section, and an intermediate section connecting said front section and said rear section, said intermediate and front sections together forming a rounded tapered portion extending forward to a point, said front section being straight, and said intermediate section being curved upward, each said tine extending longitudinally of said chassis, said front section of each said tine extending forward of said front end of said chassis to said point, said front sections of said tines when in neutral position being level and slightly below the top of said roller means, said rear sections of said tines abutting against adjacent rear sections of tines, said rear sections of said tines being independently pivotally mounted on transverse bar means mounted on said chassis.

9. The harvester of claim 8, wherein said rear sections of said tines are of square section and transverse camshaft means contact said rear sections of said tines, said camshaft having alternately offset cams, contacting alternate rear sections of said tines.

10. The fruit harvester of claim 8, additionally including suction duct means having intake means transverse of said front end above said tines, said suction duct extending rearward to pass over fruit storage means to suction generating means.

11. The fruit harvester of claim 10, wherein said suction duct means comprises forward wall means spaced apart a substantially constant distance from rear wall means extending transverse of said tine means, and spaced apart side wall means connecting said forward and rear wall means, extending substantially vertically upward from said intake means, and curving rearward, said rear wall means having a transverse rear end above said fruit storage means.

12. The fruit harvester of claim 11, wherein said suction duct means has substantially the same cross sectional area from said intake means to said rear end of said rear wall means.

13. The fruit harvester of claim 11, wherein said intake means of said suction duct means extends laterally outside said tine array.

14. The fruit harvester of claim 11, wherein said chassis is selfpropelled.

15. In a fruit harvester including a chassis having front and rear ends, and tine means arrayed transversely of said front end and mounted thereon, the improvement comprising suction duct means having intake means transverse of said front end above said tine means said suction duct extending rearward to pass over fruit storage means to suction generating means, said fruit storage means and said suction generating means being mounted on the rear end of said chassis.

said suction duct means including forward wall means spaced apart a substantially constant distance from rear wall means extending transverse of said tine means, and spaced apart side wall means connecting said forward and rear wall means, said side wall means extending upward from said intake means, and curving rearward above said fruit storage means and said suction generating means, said rear wall means having a transverse rear end above said fruit storage means.

16. The fruit harvester of claim 15, wherein said suction duct means has substantially the same cross sectional area from said intake means to said rear end of said rear wall means.

17. The fruit harvester of claim 15, wherein said intake means of said suction duct means extends laterally outside said tine array.

18. The fruit harvester of claim 15, wherein said suction duct means extends substantially vertically upward from said intake means.

19. The fruit harvester of claim 18, wherein said suction duct means has substantially the same cross sectional area from said intake means to said rear end of said rear wall means.

20. The fruit harvester of claim 18, wherein said intake means of said suction duct means extends laterally outside said tine array.

* * * * *